May 26, 1970     N. COPES     3,513,510
SEAT BELT BUCKLE
Filed Aug. 8, 1968
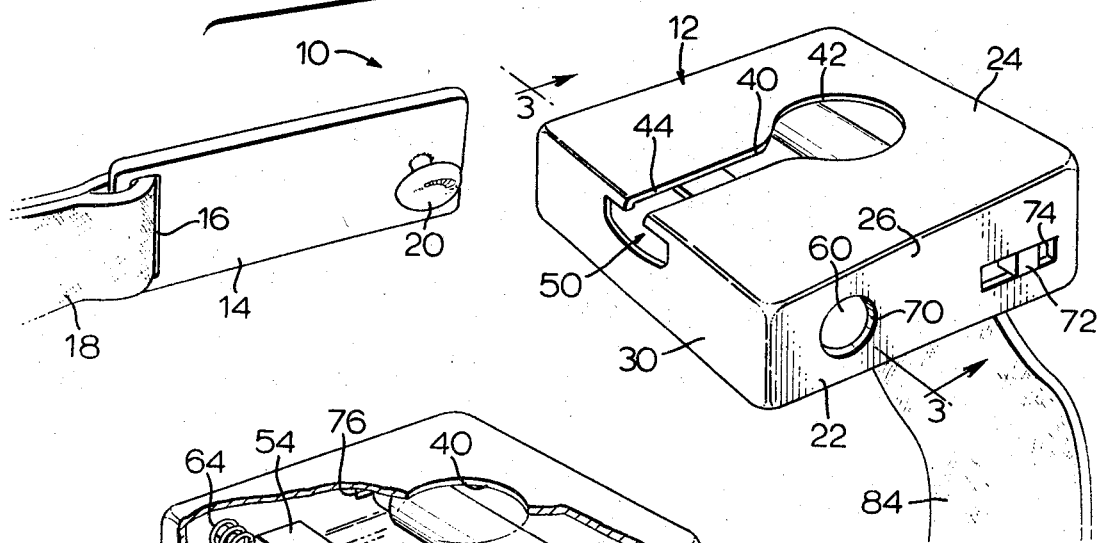
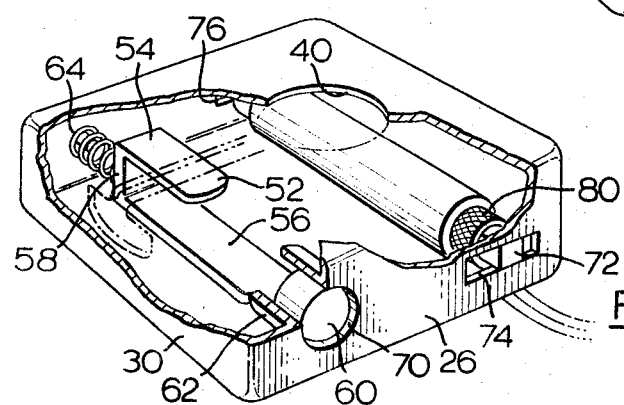
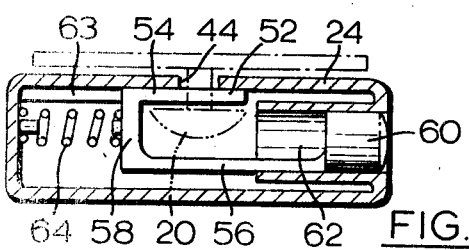
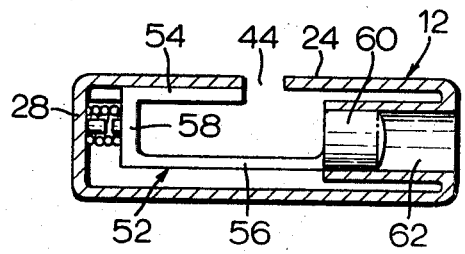
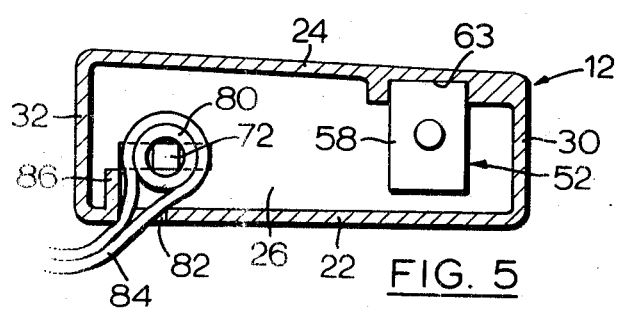
INVENTOR.
NICHOLAS COPES
BY Arne J. Fors
Agent

United States Patent Office 3,513,510
Patented May 26, 1970

---

3,513,510
SEAT BELT BUCKLE
Nicholas Copes, 14 Baymark Road,
Thornhill, Ontario, Canada
Filed Aug. 8, 1968, Ser. No. 751,185
Int. Cl. A44b *11/25, 19/00*
U.S. Cl. 24—77                         4 Claims

ABSTRACT OF THE DISCLOSURE

A seat belt buckle composed of a box shaped housing to which one end of a belt is adjustably secured and a plate shaped member to which the other end of the belt is secured. Formed in the housing is an aperture having enlarged end portions, one formed in the top wall and the other formed in the front wall. The end portions are spaced apart by an elongated slot shaped portion. A pin secured to the plate shaped member is adapted to fit into the enlarged portion of the aperture formed in the top wall, to slide along but be retained in the slot shaped portion and to be removed from the enlarged portion in the front wall. A retaining member or tongue positioned in the slot shaped portion blocks the passage of the pin. Manual depression of a push button moves the tongue out of the slot shaped portion thereby permitting the pin to advance to the enlarged portion in the front wall and out of contact with the housing.

---

This invention relates to an adjustable quick release buckle for seat belts and the like.

Seat belt buckles commonly are composed of a hollow box-like housing adjustably secured to one end of a seat belt and a plate-like securing member secured to the opposite end of the seat belt. The housing is adapted to receive and frictionally engage the securing member and release of the securing member is effected by rotation of a lever.

Such a buckle cannot be easily fastened with one hand; normally one hand is required to hold the housing and the other hand is required to guide the securing member into the housing. If therefore the driver of a car neglects to fasten his seat belt before he put the car into motion, he will find it extremely awkward to both steer the car and fasten his seat belt. If he attempts to do so he will be endangering both his own life and the lives of others.

It is accordingly an object of the present invention to provide a seat belt buckle which permits the user thereof to fasten the seat belt with one hand.

It is another object to provide a low cost and rugged buckle which can be manufactured simply and inexpensively with a relatively small number of manufacturing and assembly operational steps.

These and other objects may be accomplished by providing a seat belt buckle including a securing member; a pin composed of a first element attached to the securing member and a second element, the cross sectional area of the second element exceeding that of the first element; a housing having edges defining an aperture, the aperture having enlarged end portions spaced apart by an elongated slot shaped portion, each end portion adapted to permit passage of the second element therethrough, the defining edges of the elongated portion being sufficiently far apart to permit slidable movement of the first element therealong but insufficiently far apart to permit the second element to pass therebetween; and a slidable retaining member biased by resilient means to constitute an obstacle to the first element when the first element is between the defining edges of the elongated portion and adapted to be moved to a non-obstructing position by the application of force opposing the bias of the resilient means; and means for adjustably securing an end of a seat belt to the housing.

A fuller understanding of the invention may be had by referring to the following description and claims taken in conjunction with the accompanying drawing in which:

FIG. 1 is a perspective view of the elements of the buckle in a disconnected relation;

FIG. 2 is a perspective view, partly cut away, of the buckle housing;

FIGS. 3 and 4 are views on line 3—3 of FIG. 1; and

FIG. 5 is an elevation of the buckle housing in which a side wall has been removed.

Like reference characters refer to life parts throughout the description of the drawing.

With reference to FIG. 1, the invention is shown incorporated into buckle generally designated 10 composed of housing 12 and securing member 14. Slot 16 is formed in one end of securing member 14 through which a length 18 of the seat belt is passed in order to secure the belt to securing member 14. A pin 20 is fastened to securing member 14 at the end opposite to which the belt is secured. Pin 20 is in the form of a truncated bolt composed of two elements, a first element in the form of a shank and a second element in the form of a round head. The cross-sectional area of the head is greater than that of the shank. Pin 20 is provided to fasten securing member 14 to housing 12 when desired.

Housing 12 is in the form of a hollow rectangular box composed of generally square walls 22 and 24 spaced apart by upstanding parallel side walls 26 and 28 and parallel front and rear walls 30 and 32 respectively. An aperture 40 is formed in wall 24 and front wall 30. That portion of aperture 40 formed in wall 24 is key-hole shaped having a circular portion 42 and an elongated slot shaped portion 44. The diameter of circular portion 42, being slightly greater than the diameter of the head of pin 20, is adapted to permit the head to pass therethrough. Slot shaped portion 44 is slightly wider than the diameter of the shank of the pin 20 but is narrower than the diameter of the head. That portion of aperture 40 in front wall 30, indicated by the numeral 50 in FIG. 1 is composed of a wide section and a narrow section, the narrow section having the same width as slot shaped portion 44 and being an extension thereto. Slot shaped portion 44 and the narrow section of portion 50 from a continuous slot along which the shank of pin 20 may move. Pin 20 may thus be introduced into circular portion 42 and slid along slot shaped portion 44. The edges defining slot shaped portion 44 prevent pin 20 from being removed therebetween. Pin 20 may only be removed from housing 12 through portion 42 or portion 50.

A retaining member 52 is slidably mounted within housing 12. Member 52 is generally J shaped having a pair of parallel limbs 54 and 56 spaced apart by an intermediate portion 58. As shown member 52 is so mounted that its longitudinal axis is normal to slot shaped portion 44 of aperture 40. A tubular portion 60 is secured to the free end of limb 56 and is slidably mounted within sleeve 62 (best seen in FIG. 3) forming a part of side wall 26. As shown in FIGS. 3 and 5 limb 52 slides within a groove 63 formed in the interior surface of wall 24. Resilient means in the form of a compression spring 64 is secured at one end to side wall 28 and at the other end to intermediate portion 58. Spring 64 urges retaining member 52 away from side wall 28 and toward side wall 26. As shown access to tubular portion 60 is provided by orifice 70 formed in side wall 26.

The position which retaining member 52 assumes when no pressure is applied to tubular portion 60 is shown in FIG. 3. It will be seen that in such a position limb 54 constitutes an obstruction to the free travel of the shank of pin 20 within slot shaped portion 44 of aperture 40. When pressure is applied to tubular portion 60, limb 54 no longer obstructs the free travel of the shank as illustrated in FIG. 4.

Spindle 72 is positioned within housing 12 and is mounted in slots 74 and 76 formed in side walls 26 and 28 respectively. Spindle 72 while maintaining a parallel relationship with rear wall 32 may slide freely forward and rearward in slots 74 and 76. A corrugated shaft 80 is hollowed for admission of spindle 72 and is mounted for rotation thereabout. As clearly shown in FIG. 5, a slot 82 is formed in wall 22 for the admission of a length 84 of the seat belt. As shown, length 84 is placed around shaft 80 and both the anchored end and the free end of the belt extend beyond body portion 12. Shoulder 86 is provided to frictionally engage length 84.

The operation of buckle 10 will be readily apparent. The user has merely to bring securing member 14 into contact with housing 12 so that pin 20 passes through the circular portion 42 of aperture 40. The free end of length 84 of the belt should then be extended from housing 12 so that the belt tightens about the user and the shank of pin 20 moves into contact with limb 54. Groove 63 prevents limb 54 from moving out of contact with the shank when pressure is applied thereto by pin 20. The head of pin 20 cannot then be removed from housing 12 unless it is returned to circular portion 42. To release the buckle, the user need only press tubular portion 60 inward until limb 54 moves out of contact with the shank and pin 20 is free to advance toward portion 50 and out of contact with housing 12.

As an alternative, limb 54 may be fork shaped having an inclined edge which contacts the shank of pin 20 and a shank receiving groove. The pressure exerted by pin 20 against the inclined edge of limb 54 will cause spring 64 to compress and the shank will move into the shank receiving groove whereupon spring 64 will urge limb 54 into the position shown in FIG. 3. The shank will then be prevented from moving both into portions 50 and 42 of aperture 40 until tubular portion 60 is pressed inward.

It will be understood of course that modifications can be made in the embodiments described and illustrated herein without departing from the scope and purview of the appended claims.

What I claim as new and desire to protect by Letters Patent of the United States is:

1. A seat belt buckle including a securing member; a pin composed of a first element attached to said securing member and a second element, the cross-sectional area of said second element exceeding that of said first element; a housing having edges defining an aperture, said aperture having enlarged end portions spaced apart by an elongated slot shaped portion, each said end portion adapted to permit passage of said second element therethrough, the defining edges of said elongated portion being sufficiently far apart to permit slidable movement of said first element therealong but insufficiently far apart to permit said second element to pass therebetween; a slidable retaining member biased by resilient means to constitute an obstacle to said first element when said first element is between the defining edges of said elongated portion and adapted to be moved to a non-obstructing position by the application of force opposing the bias of said resilient means; and means for adjustably securing an end of a seat belt to said housing.

2. A seat belt buckle as claimed in claim 1 wherein said means for adjustably securing an end of the seat belt to said housing includes a shaft rotatably attached to said housing around which an end of said belt is wrapped and a shoulder to frictionally engage said end, said shaft being disposed normal to said elongated portion and adapted for slidable movement in the direction of said elongated portion.

3. A seat belt buckle as claimed in claim 1 wherein said pin is in the form of a truncated bolt having a head constituting said second element and shank constituting said first element.

4. A seat belt buckle as claimed in claim 2 wherein said pin is in the form of a truncated bolt having a head constituting said second element and shank constituting said first element.

References Cited

UNITED STATES PATENTS

| | | | |
|---|---|---|---|
| 401,977 | 4/1889 | Spooner | 24—223 |
| 872,741 | 12/1907 | Nevins et al. | 24—223 |
| 1,178,339 | 4/1916 | Ocumpaugh | 24—223 |
| 2,737,046 | 3/1956 | Jancsics | 24—116.1 |
| 2,743,894 | 5/1956 | Ostnas | 24—201.1 |
| 3,130,466 | 4/1964 | Carter | 24—77 X |
| 3,196,509 | 7/1965 | Frew | 24—77 |
| 3,332,163 | 7/1967 | Stewart et al. | 24—116.1 |

FOREIGN PATENTS

| | | |
|---|---|---|
| 1,125,422 | 7/1956 | France. |
| 1,103,516 | 2/1968 | Great Britain. |

PETER M. CAUN, Primary Examiner

U.S. Cl. X.R.
24—116, 223, 230